United States Patent [19]

Maurel

[11] 4,432,947
[45] Feb. 21, 1984

[54] PROCESS FOR OBTAINING MOLYBDENUM AS A USEFUL PRODUCT FROM MOLYBDENIFEROUS SOLUTIONS CONTAINING ALKALI METAL CARBONATE, SULPHATE, HYDROXIDE OR HYDROGEN CARBONATE AND POSSIBLY URANIUM

[75] Inventor: Pierre Maurel, Atx-en-provence, France

[73] Assignee: Uranium Pechiney Ugine Kuhlmann, France

[21] Appl. No.: 398,831

[22] Filed: Jul. 16, 1982

[30] Foreign Application Priority Data

Jul. 31, 1981 [FR] France ................. 81 15244

[51] Int. Cl.$^3$ ............................. C01G 39/02
[52] U.S. Cl. ........................... 423/55; 423/58; 423/53; 423/11; 423/15
[58] Field of Search ............. 423/11, 15, 17, 55, 423/58, 65

[56] References Cited

U.S. PATENT DOCUMENTS 3,656,888  4/1972  Barry et al. ................. 423/606

FOREIGN PATENT DOCUMENTS 2404601  4/1979  France ................. 423/55
2479793  9/1981  France ................. 423/55

Primary Examiner—Herbert T. Carter
Attorney, Agent, or Firm—McDougall, Hersh & Scott

[57] ABSTRACT

A process for obtaining molybdenum as a useful product from aqueous solutions to be purified, according to claim 1 of French patent No. 2 404 601, which contain, besides said molybdenum, alkali metal carbonate, sulphate, hydroxide or hydrogen carbonate and which may also contain uranium, and inorganic and/or organic impurities, said solutions being treated at a temperature which is at most equal to the boiling temperature by means of lime to convert the alkali metal carbonate into hydroxide and to precipitate the insoluble calcium salts formed, then separating and washing the first precipitate which essentially contains calcium carbonate, from an alkali metal hydroxide-enriched liquor, which is concentrated by evaporation at the same time as the washing liquor of the first precipitate, to produce an alkali metal hydroxide content which is at most equal to 50%, to produce a second precipitate formed by a mixture of alkali metal molybdate and sulphate, characterized in that said solid mixture is dispersed in an acid aqueous liquor which is heated at from 120° C. to 250° C. under pressure to cause precipitation of anhydrous MoO$_3$ which is subsequently separated from the mother liquor which essentially contains alkali metal sulphate.

11 Claims, 1 Drawing Figure

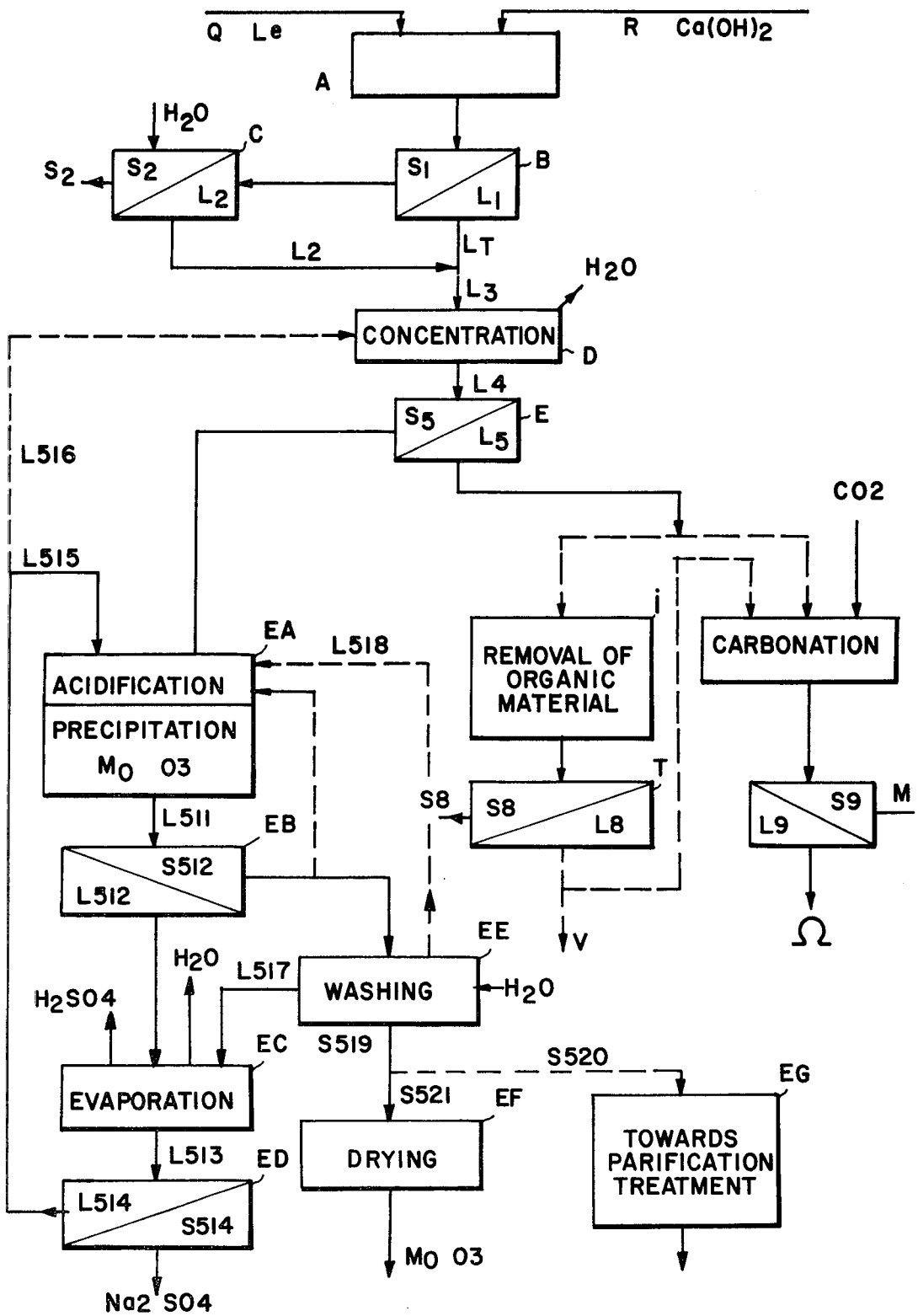

PROCESS FOR OBTAINING MOLYBDENUM AS A USEFUL PRODUCT FROM MOLYBDENIFEROUS SOLUTIONS CONTAINING ALKALI METAL CARBONATE, SULPHATE, HYDROXIDE OR HYDROGEN CARBONATE AND POSSIBLY URANIUM

The present invention concerns a process for obtaining a molybdenum as a useful product from molybdeniferous solutions containing alkali metal carbonate, sulphate, hydroxide or hydrogen carbonate, and possibly uranium.

In French Pat. No. 2 404 601 dated Sept. 30, 1977, the present applicants described a process for purifying solutions containing sodium carbonate, sulphate, hydroxide or hydrogen carbonate and one at least of the metals belonging to the group formed by uranium and molybenum in the form of sodium salt.

Such solutions originated from a cycle involving attacking a uraniferous ore which contains molybdenum as a particular impurity, after precipitation and separation of the metal which is to be produced as the useful product, in accordance with a known method.

Thus, in the case of a uraniferous ore for example, the ore being attacked by a sodium carbonate and/or bicarbonate liquor, the solubilised uranium which is present in the liquor after the attack operation was usually precipitated in the form of sodium uranate. The sodium uranate may be converted:

either into ammonium uranate which is in a crystallised form, by sulphur-ammonium transposition, which comprised treating the sodium uranate with a solution of ammonium sulphate, or into uranium peroxide by sulphuric redissolution and precipitation by the introduction of hydrogen peroxide.

Irrespective of the method involved in precipitation and separation of the uranium, for example in the form of sodium uranate, which is optionally converted into uranium peroxide, such operations resulted in the production of solutions containing sodium carbonate, sulphate, hydroxide or hydrogen carbonate, which had to be purified before being recycled to the ore attack operation. Now, it is known in fact that impurities normally have an unfavourable effect on the qualities of the main product which is being sought, and the presence of such impurities at excessively high levels of concentration may be a troublesome consideration in the attack operation using a recycled liquor and/or may give rise to untimely precipitation at various points in the production circuit.

In the specialist literature in this art, it is often pointed out that the removal of the impurities present in the circulating liquors is effected at the same time as the sterile matter, in the form of impregnation liquor, as a result of an insufficient washing action.

Dumping sterile matter which still has a high sodium content or the above-mentioned liquors in the natural environment is becoming increasingly inconceivable and prohibited by national legislation, by virtue of the irreversible damage that such effluent can cause in the natural environment.

Now, if it appears to be desirable to provide for improved washing of the sterile matter in order to improve the level of recovery of the reactants and the product which is to constitute the useful product, in contrast the amount of impurities present in the circuit increases at the same time.

Hence, it becomes necessary to use a process which permits the impurities to be extracted in a sufficient quantity from the liquors to be treated in order for the impurity content thereof not to be such as to give rise to the above-mentioned disadvantages.

It is with that in mind that the present applicants described, in French Pat. No. 2 404 601, a process for purification of the above-indicated solutions, which was characterised in that said solutions were treated at a temperature which is at most equal to boiling temperature, with an amount of lime of from 0.1 to 20 times the stoichiometric amount required for converting the carbonates present into free sodium hydroxide, without taking account of the amount of lime necessary for precipitating the insoluble metal compounds of calcium, then that separation and washing of a first precipitate were effected, said first precipitate essentially containing calcium carbonate and a mixture of other organic and inorganic calcium salts, and a sodium hydroxide-enriched liquor, that the mixture of said liquor and the washing liquor of the first precipitate was concentrated by evaporation until the sodium hydroxide content was at most equal to 50%, to cause the production of a second precipitate, that the crystals of said second precipitate were separated from their sodium hydroxide-rich mother liquor and that said sodium hydroxide-rich liquor was recovered.

In that process, the second precipitate was essentially formed by sodium sulphate.

As the sodium hydroxide-rich mother liquor produced by separation of the sodium sulphate precipitate still contained impurities, the applicants considered that it was desirable to carry out a treatment on said liquor in order to extract therefrom the components such as molybdenum, organic materials and the like, which give rise to problems in regard to subsequent use thereof.

Thus, in accordance with this invention, the applicants had proposed a treatment for removing molybdenum in the form of a sulphide, which treatment comprised acidifying the hydroxide-rich mother liquor produced after separation of the sodium sulphate, and precipitating the molybdenum sulphide by the addition of an alkali metal sulphate. In spite of the attraction of such a treatment, major disadvantages were found, which could cause the use of the treatment to be limited. In fact, the treatment required complete neutralisation by means of sulphuric acid of the sodium hydroxide-rich mother liquor from which sodium sulphate had just been removed. As soon as the mother liquor was purified in respect of molybdenum by precipitation by means of sulphide ions, it was necessary again to remove the $SO_4^=$ ions introduced for the neutralisation operation and to reconstitute the recycling liquor which is intended for the attack operation, by introducing thereinto the desired amounts of $CO_3^=$ and $HCO_3^-$ ions.

It is because of such disadvantages that, the present applicants proposed a novel process for extracting molybdenum from solutions to be purified comprising sodium carbonate, sulphate, hydroxide or hydrogen carbonate, such solutions originating from a cycle involving attack uraniferous ores, and containing molybdenum as a particular impurity after alkaline attack on the ore and extraction of uranium in the form of a concentrate, and being intended for treatment by caustification by introducing lime, which was characterised in that the molybdnum was extracted in the form of a sulphur compound by introducing sulphide ions into an acidified aliquot fraction of said solutions before effecting caustification thereof.

In its essential features, this process for extracting molybdenum from solutions to be purified, resulting from the treatment of uraniferous ores, comprised the following steps:

taking off, before caustification, an aliquot fraction of the solutions to be treated, which is intended to provide for extraction of the major part of the molybdenum in solution, while the remainder of the solutions is passed to the caustification operation, in accordance with the patent;

acidification of the aliquot fraction of the solutions to be treated, by means of an acid agent;

introducing sulphide ions into said acidified aliquot fraction;

separating the molybdenum precipitate impregnated with mother liquors from a liquor which is still acid but which has a reduced molybdenum content, and to which the washing waters of said precipitate are added;

mixing the aliquot fraction with its reduced molybdenum content, with the fraction of solutions to be purified, after having been subjected to the caustification cycle in accordance with the main patent;

concentrating the liquid fractions resulting from the molybdenum removal operation and the caustification operation, to produce a second precipitate formed by sodium sulphate;

separating the crystals of said second precipitate which is impregnated with a sodium hydroxide-rich mother liquor;

washing the second precipitate, with recycling of the washing waters to the concentration operation, and recovery of the sodium hydroxide-rich liquor.

In comparison with the main patent, the above-indicated process had the advantage of a lower level of consumption of $Ca(OH)_2$, with the introduction of a smaller amount of $H_2SO_4$ to neutralise just the aliquot fraction intended for the molybdenum extraction step, as well as a low level of consumption of carbon dioxide gas for regenerating the liquors which were recycled to the attack operation.

In addition, the above-indicated process provided for the removal by a concentration action of the $SO_4^=$ ions which were initially present in the solution to be purified and those introduced into the aliquot fraction to provide for neutralisation thereof and to permit precipitation of the molybdenum.

However, the amounts of $H_2SO_4$ added for neutralising the aliquot fraction intended for the molybdenum removal step, and the amounts of $CO_3^=$ ions introduced into the liquor resulting from the operation of separating the sodium sulphate for the purposes of recycling that liquor to the ore attack operation were still considered to be excessive.

It is for that reason that, the applicants proposed a process for extracting molybdenum, which avoided the above-indicated disadvantages.

The above-mentioned process for extracting molybdenum from aqueous solutions to be purified, which contain alkali metal carbonate, sulphate, hydroxide or hydrogen carbonate and which may also contain uranium, comprising caustification of said solutions by means of lime to convert the carbonates into alkali metal hydroxides, then separation and washing of the above-mentioned calcium carbonate, and an alkali metal hydroxide-enriched liquor, concentration by evaporation of the mixture of the alkali metal hydroxide-rich liquor and the washing liquor of the first precipitate, essentially containing calcium carbonate, to produce a second precipitate, was characterised in that the second precipitate was in the form of a mixture of alkali metal sulphate and molybdate, which was solubilised in an aqueous re-dissolution liquor, then the resulting aqueous liquor was treated by means of sulphide ions causing precipitation of the molybdenum which was subsequently separated from the mother liquor essentially containing alkali metal sulphate, and was washed and dried.

In its essential features, this process for extracting molybdenum from aqueous solutions to be purified, originating from an ore treatment cycle, comprised the following steps:

(a) caustification of the solutions with an amount of lime of from 0.1 to 20 times and preferably from 0.5 to 10 times the stoichiometric amount to convert the carbonate and bicarbonate present into alkali metal hydroxide, (b) separation of a first precipitate impregnated with mother liquors and comprising a mixture of organic and inorganic calcium salts from an alkali metal hydroxide-enriched liquor containing an alkali metal sulphate, (c) washing the first precipitate to extract the impregnation liquor, giving washing waters which are combined with the above-mentioned alkaline liquor which is enriched in respect of alkali metal hydroxide.

(d) concentration by evaporation of the liquor resulting from the mixing step, to produce a second precipitate which is formed by the mixture of alkali metal sulphate and molybdate, (e) separation of the crystals of the second precipitate, impregnated with an alkali metal hydroxide-rich mother liquor, (f) washing of the second precipitate with recycling of the washing waters to the concentration step (d), (g) recovery of the alkali metal hydroxide-rich liquor which may be subsequently carbonated before being recycled to the ore attack operation.

(h) redissolution in water and/or in a recycling liquor of the second precipitate, (i) introducing sulphide ions into the liquor for redissolution of the second precipitate, (j) acidification of the redissolution liquor containing the sulphide ions causing complete precipitation of molybdenum sulphide and the formation of a suspension of said sulphide in the aqueous phase, (k) separation of the molybdenum sulphide precipitate from an aqueous alkali metal sulphate-rich liquor, and (l) drying and calcination of the molybdenum sulphide.

In that process, the molybdenum is put into the form of a useful product as $MoS_3$ which, for production thereof, required the use of an alkaline sulphide in an acid medium. Accordingly, the precipitation medium was the source of production of hydrogen sulphide which is troublesome from the point of view of exploitation and from the environmental point of view, and gave rise to the danger of causing partial reduction of the Mo in the form of 'molybdenum blue'. In addition, the molybdenum trisulphide produced was not a normal industrial product and therefore required a particular calcination treatment to permit it to be put to commercial use.

It is for that reason that the applicants, continuing their research, found that it was possible to put the molybdenum into the form of a useful product by means of a novel process which avoids the above-indicated disadvantages.

The process according to the invention for producing molybdenum as a useful product from aqueous solutions to be purified containing alkali metal carbonate, sulphate, hydroxide or hydrogen carbonate and optionally also containing uranium, which comprises caustification of said solutions by means of lime to convert the carbonates into alkali metal hydroxides, then separation and washing of the above-mentioned calcium carbonate, from a liquor which is enriched in respect of alkali metal hydroxide, and concentration by evaporation of the mixture of the alkali metal hydroxide-rich liquor and the washing liquor of the first precipitate which essentially contains calcium carbonate, to produce a second precipitate formed by a mixture of alkali metal sulphate and molybdate, is characterised in that said solid mixture is dispersed in an acid aqueous liquor which is heated under pressure so as to cause precipitation of anhydrous $MoO_3$ and then said $MoO_3$ precipitate is separated from the mother liquor which is concentrated to cause precipitation of the alkali metal sulphate.

In its essential features, the novel process for producing molybdenum in the form of a useful product from aqueous solutions to be purified, which results from an ore treatment cycle, comprises the following steps:

(a) caustification of the solutions by an amount of lime of from 0.1 to 20 times and preferably from 0.5 to 10 times the stoichiometric amount to convert the carbonates and bicarbonates present into alkali metal hydroxide, (b) separation of a first precipitate impregnated with mother liquors and comprising a mixture of organic and inorganic calcium salts, from an alkali metal hydroxide-enriched liquor containing an alkali metal sulphate, (c) washing of the first precipitate to extract the impregnation liquor, giving washing waters which are combined with the above-mentioned alkaline liquor which is enriched in respect of alkali metal hydroxide, (d) concentration by evaporation of the liquor resulting from the mixing step, to produce a second precipitate formed by the mixture of alkali metal sulphate and molybdate, (e) separation of the crystals of said second precipitate impregnated with an alkali metal hydroxide-rich mother liquor, (f) optional washing of the second precipitate with recycling of the washing waters to the concentration step (d), (g) recovery of the alkali metal hydroxide-rich liquor which may be subsequently carbonated before being recycled to the ore attack operation, (h) dispersion in water and/or in a recycling liquor, (i) acidification of the liquor (h) for dispersion of the second precipitate, (j) heating under pressure of said acidified dispersion, at a temperature such that anhydrous $MoO_3$ is precipitated, and a suspension of said oxide in the aqueous phase is formed, (k) separation of an aqueous alkali metal sulphate-rich liquor from the precipitated anhydrous $MoO_3$, which is washed, (l) evaporation of the alkali metal sulphate-rich liquor, causing precipitation of said sulphate, and (m) separation of said sulphate and recycling of the liquor produced to the evaporation and/or acidification steps.

Hereinafter in this description, and in order to simplify comprehension thereof, the alkali metal salts to which reference is made are only those of sodium and potassium.

In accordance with the main patent, caustification of the solutions is generally effected by introducing an amount of lime which is at least equal to the stoichiometric amount required for virtually complete conversion of the alkali metal carbonate present in the liquor into free sodium hydroxide, in accordance with the following reaction:

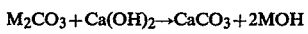

$$M_2CO_3 + Ca(OH)_2 \rightarrow CaCO_3 + 2MOH$$

in which M may be sodium or potassium.

When the solutions to be caustified contain metal salts which are capable of forming an insoluble compound, with the lime and under the conditions of operation, the total amount of lime introduced is formed by the amount of lime which is actually necessary for caustification of the carbonates in solution and the amount of lime necessary for precipitating said metal elements in the form of insoluble calcium compounds. Hence, and in order to simplify understanding of the subject of the present invention, we shall mention only the amount of lime which is actually necessary for solely caustifying the alkali metal carbonates.

The corresponding temperature of the caustification treatment is at most equal to the boiling temperature of the liquor being treated. It is therefore between 20° C. and 100° C. but preferably between 50° C. and 97° C.; in most cases, precipitation and filtrability of the residue obtained are improved when the caustification temperature is close to the boiling temperature.

The precipitate is essentially formed by calcium carbonate and the excess lime and, in a minor amount, organic and inorganic calcium salts.

Separation of the first precipitate and the alkaline mother liquor is effected by known means such as for example filtration, centrifuging, settling, etc.

The mother liquor is then subjected to concentration by evaporation until reaching a level of concentration in respect of alkali metal hydroxide which is at most 50%, causing simultaneous precipitation of alkali metal molybdate and sulphate. The second precipitaate is then collected, and is separated from the alkali metal hydroxide-rich mother liquor by known means, and then washed with water or with an alkali metal sulphate-saturated aqueous solution, the washing liquor being recycled to the concentration operation.

As the alkali metal hydroxide-rich mother liquor which is recovered still contains impurities, it may be desirable to carry out a treatment on said liquor for extracting therefrom the elements which are troublesome in regard to subsequent use thereof, such as organic substances and the like. Likewise, the liquor may be subjected to a transformation treatment before being used in the production cycle.

In accordance with a first alternative procedure for removing the organic materials, the sodium-bearing mother liquor is treated in known manner:

either with a barium compound, making use of the low level of solubility of barium organates in the sodium medium. The barium compound is introduced in an amount which is at least equal to the stoichiometric amount required to cause precipitation and removal by separation of the organates of that metal, or with sodium dioxide, causing 'in situ' degradation of the organic materials, or with hydrogen peroxide, causing the same degradation effect, or finally by passing said liquor over activated carbon having the known property of retaining the organic elements present in the mother liquor being treated.

In a second alternative procedure, the sodium-bearing mother liquor may be partially or totally carbonated by bringing it into contact with carbon dioxide gas using known means, for example by blowing a large excess of carbon dioxide gas into the mother liquor. Depending on the conditions under which that operation is carried out, it is possible to produce a sodium carbonate precipitate which can be subsequently separated.

Depending on the characteristics of the alkaline mother liquor upon being discharged from the evaporation step and the uses to which the purified liquor is to be put, it is possible to use one or other of the above-indicated procedures, or for such procedures to be partially or totally combined.

In accordance with the process of the invention, the second precipitate formed by a mixture of alkali metal molybdate and sulphate is generally dispersed in water and/or an aqueous recycling liquor containing $SO_4^=$ ions. The aqueous dispersion is then used again to carry out the treatment of producing molybdenum in the form of a useful product.

The above-mentioned treatment of molybdenum comprises acidifying the dispersion of the mixture of alkali metal sulphate and molybdate by means of an acid aqueous solution in such a way that the mass of free $H_2SO_4$ in the dispersion which is thus formed is from 2% to 20% of the mass of the liquid phase of the dispersion.

The consumption of sulphuric acid converted into alkali metal sulphate in the operation of precipitation of anhydrous $MgO_3$ is compensated for, by introducing fresh acid at any point in the molybdenum treatment circuit and preferably when dispersing the precipitate of alkali metal molybdate and sulphate in an acid aqueous liquor, or when concentrating the liquor resulting from separation and washing of $MoO_3$.

The temperature at which the operation of precipitating anhydrous $MoO_3$ is performed is in the range of from 120° C. to 250° C. and preferably in the range of from 140° C. to 180° C.

The applicants have found that the period for which the temperature was maintained in the above-indicated range was from 0.5 hour to 10 hours, but that the length of that period was not critical in itself.

Finally, in order to enhance the physical properties of the anhydrous $MoO_3$ crystals, such properties affecting the filtrability of the reaction medium and the incidence of encrustation on reaction vessel walls, it is important to introduce a minor amount of anhydrous $MoO_3$ seed into the $MoO_3$ precipitation medium.

BRIEF DESCRIPTION OF THE DRAWING

The present invention will be better appreciated from the description of the accompanying diagrammatic view. The drawing is a diagrammatic representation of the process according to the invention, indicating in solid lines the circuit used when molybdenum is to be produced in the form of a useful product and only alkali metal sulphate and carbonate are to be removed, while the broken lines show the circuits for subjecting the hydroxide-rich mother liquor resulting from the caustification operation either to a treatment for additional purification in respect of organic materials, or a carbonation treatment, by carrying out the additional treatment referred to above for that purpose, or by performing a complete treatment by successively carrying out the additional treatments referred to above.

The alkaline solutions Le to be treated, and the lime required, are introduced into A by means of Q and R. The slurry produced after treatment with the lime is introduced into the region B for separation of a cake $S_1$ and a liquor $L_1$ containing certain solubilised impurities. The mother liquors of the cake $S_1$ are extracted in C by means of an mount of water which is introduced thereat. The mother liquors $L_2$ which are extracted in this way are mixed with the liquor $L_1$, forming the liquor $L_3$. The resulting cake $S_2$ which is extracted from C is essentially formed by calcium carbonate.

The liquors $L_3$ formed by the mixture of liquors $L_1$ and $L_2$ is passed into D for a treatment comprising concentration in respect of alkali metal hydroxide by the evaporation of water, causing precipitation of a mixture of alkali metal molybdate and sulphate.

The slurry $L_4$ issuing from the concentration step is introduced into E for separating a cake $S_5$ and a liquor $L_5$.

The cake $S_5$ which essentially comprises the mixture of alkali metal sulphate and molybdate is entrained into EA where it is put into suspension in an acid recycling liquor $L_{515}$. The suspension which is prepared in that manner and which is subjected to agitation is heated at a suitable temperature to cause precipitation of anhydrous $MoO_3$.

The resulting slurry $L_{511}$ is treated in EB for separation of a cake $S_{512}$ essentially formed by anhydrous $MoO_3$ and a liquor $L_{512}$ which contains in solution the alkali metal sulphate and sulphuric acid which is passed to the evaporation operation EC.

A sufficient amount of sulphuric acid is also introduced into the region EC and concentration by evaporation is performed, to precipitate the major part of the alkali metal sulphate present.

The slurry $L_{513}$ from the evaporation region is decanted into a region ED for separation of solid and liquid phases $S_{514}$ and $L_{514}$ respectively.

The phase $S_{514}$ which is formed by alkali metal sulphate is removed from the circuit.

The liquor $L_{514}$ is then recycled as $L_{515}$ to the acidification region EA, and a part thereof may possibly be recycled as $L_{516}$ to the concentration region D when it includes impurities, the accumulation of which would give rise to problems in the $MoO_3$ precipitation circuit.

The cake $S_{512}$ which is essentially formed by anhydrous $MoO_3$ is passed into a washing region EE comprising at least one washing stage. The cake is washed by means of a suitable amount of water and the liquor resulting from the washing operation is generally passed into an evaporation region EC as $L_{517}$, but all or part of that liquor may possibly be passed into the acidification region EA, as $L_{518}$.

However, it may be advantageous to take off a part of the cake $S_{512}$ before it is washed, to recycle it to the acidification-precipitation region EA, that fraction of the cake then acting as a seed for crystallisation of anhydrous $MoO_3$.

On issuing from the washing region EE, the cake $S_{519}$, depending on the uses envisaged in respect thereof, may be entirely or partially passed into the drying region EF, as $S_{521}$ and/or into the region EG as $S_{520}$, in order therein to undergo an additional purification treatment.

The alkali metal hydroxide-rich liquor $L_5$ coming from step E may contain in a dissolved condition impurities such as for example various organic and inorganic salts which it may be desirable to remove.

If the organic materials present in the liquor $L_5$ are to be removed, the liquor is introduced into I with for example a suitable amount of a barium compound, to cause precipitation of barium organates. The slurry from I is then introduced into T for separation of a cake $S_8$ and a liquor $L_8$ which may be collected in V or recycled to another step in the process such as for example the CARBONATION step Likewise, if it is desirable for the alkali metal hydroxide-rich liquor $L_5$ to be carbonated, the liquor $L_5$ is introduced into the CARBONATION step in order therein to undergo carbonation by blowing in $CO_2$. The resulting slurry may be used in the form in which it is produced or it may be treated in M to separate the cake $S_9$ formed by alkali metal carbonate and a carbonated liquor $L_9$ which may be collected in $\Omega$ or recycled to the CARBONATION step, in order to produce a solid alkali metal carbonate.

However, it will be evident that the hydroxide-rich liquor $L_5$ may be successively subjected to those two treatments, depending on the impurities which are to be removed and depending on the uses for which the liquor is intended after purification.

The process according to the invention is noteworthy by virtue of its flexibility and adaptability. That is very important because, if alkali metal sulphate is generally present in the solutions to be purified, and if moreover alkali metal carbonate is also generally present, the other components present may vary qualitatively and quantatively according to the origin of the solutions to be treated. Thus, the process is found to be particularly attractive from the environmental point of view, as it does not involve dumping liquid waste matter in the environment.

In addition, this process enjoys other advantages, of which we may first mention the possibility of recycling a concentrated solution of alkali metal hydroxide or a solution of alkali metal carbonate, possibly a suspension of that salt, or even alkali metal carbonate in the solid state, although there is also the possibility of being able to control as required the amount of alkali metal sulphate which is recycled, as well as the amounts of impurities (molybdenum, organic materials, etc.).

The advantages of the process according to the invention will be much better appreciated from the following example which is given by way of illustration:

EXAMPLE (illustrated in the drawing)

A sodium hydroxide-rich solution which was drawn off at the end of a uraniferous ore attack cycle, after precipitation and separation of sodium uranate, was treated in accordance with the process of the invention. The composition of the solution Le was as follows, by weight:

| NaOH | 4.7 kg |
| $Na_2CO_3$ | 31.88 kg |

-continued

| $Na_2SO_4$ | 9.27 kg |
| Uranium | 0.02 kg |
| Molybdenum | 3.79 kg |
| $H_2O$ and various | 599.34 kg |

The 649 kg of that solution was introduced into A with 29.67 kg of industrial lime, for effecting virtually complete caustification of the carbonate present, by heating and by maintaining the temperature of 95° C. for a period of about 3 hours.

The resulting slurry was then decanted into B for separation of the solid phase $S_1$ and the liquid phase $L_1$.

The cake $S_1$ was then rinsed in C using 35 kg of water. The mother liquors which impregnated the cake $S_1$ were thus extracted and combined with the liquor $L_1$ from the separation operation in B.

The cake $S_2$ which weighed 70.72 kg was of the following composition, by weight:

| $CaCO_3$ | 35.7 kg |
| Uranium | 0.02 kg |
| Excess $Ca(OH)_2$ | 1.5 kg |
| Impregnation $H_2O$ and various | 33.5 kg |
| Molybdenum | 0.002 kg |

The liquor $L_3$ formed by the mixture of liquors $L_1$ and $L_2$ represented a weight of 642.95 kg and was of the following composition, by weight:

| NaOH | 28.05 kg |
| $Na_2SO_4$ | 9.26 kg |
| Molybdenum | 3.79 kg |
| Water and various | 601.85 kg |

The liquor $L_3$ was passed into D where a concentration operation was carried out, by evaporation. Also introduced into the region D was the recycling liquor $L_{516}$ which weighed 3.46 kg and which was of the following composition by weight:

| Molybdenum | 0.09 kg |
| $H_2SO_4$ | 0.68 kg |
| $Na_2SO_4$ | 1.11 kg |
| Water and various | 1.58 kg |

The total amount of water evaporated in the operation of concentrating the liquors $L_3$ and $L_{516}$ in D represented a weight of 540.49 kg.

The slurry issuing from D was decanted into E for separation of a cake $S_5$ and a liquor $L_5$.

The cake $S_5$ represented a weight of 15.32 kg and was of the following composition, by weight:

| $Na_2SO_4$ | 10.86 kg |
| Molybdenum | 1.49 kg |
| $H_2O$ and various | 2.97 kg |

The liquor $L_5$ from the separation operation in E represented a weight of 90.60 kg and was of the following composition by weight:

| NaOH | 27.18 kg |
| $Na_2SO_4$ | 0.50 kg |

| | |
|---|---|
| Molybdenum | 2.39 kg |
| Water and various | 60.53 kg |

Upon discharge from E, the liquor $L_5$ may be subjected to various transformation operations, in accordance with the main patent, before being introduced into the cycle of operations again.

The cake $S_5$ was then introduced into 31.14 kg of the liquor $L_{515}$, which was of the following composition:

| | |
|---|---|
| Molybdenum | 0.82 kg |
| $H_2SO_4$ | 6.13 kg |
| $Na_2SO_4$ | 9.97 kg |
| water and various | 14.22 kg |

After the introduction of 10 grams of anhydrous $MoO_3$ acting as crystallisation seed, the slurry produced in the foregoing operation was treated for 3 hours at a temperature of 160° C., to precipitate anhydrous molybdenum oxide.

The slurry $L_{511}$ issuing from EA was decanted into the region EB for separation of a cake $S_{512}$ and a liquor $L_{512}$.

The cake $S_{512}$ was subjected to a first washing operation in EE by being slushed up with 40 kg of water. The resulting slurry was treated to separate the first washing liquor which weighed 65.06 kg, and which was of the following composition:

| | |
|---|---|
| Molybdenum | 0.45 kg |
| $H_2SO_4$ | 1.67 kg |
| $Na_2SO_4$ | 17.85 kg |
| Water and various | 45.09 kg | from a cake which was again washed with 5 kg of water. The result was then a wet cake $S_{519}$ of anhydrous $MoO_3$ which weighed 2.96 kg and was of the following composition:

| | |
|---|---|
| Molybdenum | 1.38 kg |
| Water and various | 1.58 kg | and 5.49 kg of second washing liquor, of the following composition:

| | |
|---|---|
| Molybdenum | 0.01 kg |
| $H_2SO_4$ | 0.03 kg |
| $Na_2SO_4$ | 0.36 kg |
| Water and various | 5.09 kg |

The liquor $L_{517}$ formed by the mixture of the two washing liquors referred to above was introduced into the evaporation region EC at the same time as the liquor $L_{512}$. 2.74 kg of 96% sulfuric acid was also introduced into the region EC. The resulting mixture was then subjected to an operation of concentration by evaporating 43.32 kg of water.

The slurry issuing from EC was decanted into ED for separation of a cake $S_{514}$ and a liquor $L_{514}$.

The cake $S_{514}$ represented 12.81 kg and was of the following composition, by weight:

| | |
|---|---|
| $Na_2SO_4$ | 12.37 kg |
| Water and various | 0.44 kg |

The liquor $L_{514}$ from the separation operation in ED represented a weight of 34.60 kg and was of the following composition:

| | |
|---|---|
| $H_2SO_4$ | 6.81 kg |
| $Na_2SO_4$ | 11.07 kg |
| Water and various | 16.72 kg |

Part of that liquor $L_{514}$ was passed as $L_{515}$ into the $MoO_3$ acidification-precipitation region EA, while the remainder was passed into the concentration region D, as $L_{516}$.

I claim:

1. A process for obtaining molybdenum as a useful product from aqueous solutions to be purified, which contains, besides said molybdenum, alkali metal carbonate, sulphate, hydroxide or hydrogen carbonate, comprising adding lime to the solution for reaction at a temperature below the boiling point temperature of the solution to precipitate insoluble calcium salts as a first precipitate, separating the precipitate from the remaining alkali metal hydroxide-enriched liquor, concentrating the remaining liquor by evaporation to provide a level wherein the alkali metal hydroxide is present in an amount up to 50% by weight to produce a second precipitate containing a mixture of alkali metal molybdate and sulphate, separating the second precipitate, dispersing the separated precipitate mixture in an acidic aqueous liquor, heating the dispersion under pressure to cause precipitation of anhydrous $MoO_3$ from the remaining liquor containing alkali metal sulphate.

2. A process for obtaining molybdenum as a useful product from aqueous solutions to be purified as claimed in claim 1, in which the alkali metal of the carbonate, sulphate, hydroxide or hydrogen carbonate is sodium or potassium.

3. A process for obtaining molybdenum as a useful product from aqueous solutions to be purified, according to claim 1 characterised in that the aqueous liquor in which the dispersion of the mixture of alkali metal molybdate and sulphate is produced is a sulfuric liquor.

4. A process for obtaining molybdenum as a useful product from aqueous solutions to be purified as claimed in claim 1, in which the mixture is acidified with $H_2SO_4$ in an amount to provide 2% to 20% by weight free $H_2SO_4$ in the dispersion.

5. A process for obtaining molybdenum as a useful product from aqueous solutions to be purified, as claimed in claim 1 in which fresh sulphuric acid is introduced at any point of the circuit for producing molybdate.

6. A process as claimed in claim 5, in which the sulphuric acid is introduced in the operation of dispersing the alkali metal molybdate and sulphate precipitate in the acidic aqueous liquor.

7. A process as claimed in claim 5, in which the sulphuric acid is introduced in the operation of concentrating the liquor resulting from the separation of anhydrous $MoO_3$.

8. A process for obtaining molybdenum as a useful product from aqueous solutions to be purified, according to claim 1 characterized in that the dispersion of the precipitate of alkali metal molybdate and sulphate in the acid aqueous liquor is heated at a temperature of from 120° C. to 250° C.

9. The process as claimed in claim 8, in which the dispersion of the precipitate of alkali metal molybdate and sulphate is heated at a temperature within the range of 140° C. to 180° C.

10. A process for obtaining molybdenum as a useful product from aqueous solutions to be purified, according to claim 1 characterised in that anhydrous $MoO_3$ seeds are introduced into the $MoO_3$ precipitation medium.

11. The process of claim 1 wherein the aqueous solutions to be purified contain uranium and at least one of inorganic impurities and organic impurities.

* * * * *